(12) United States Patent
Havrisciuc et al.

(10) Patent No.: US 12,606,054 B2
(45) Date of Patent: Apr. 21, 2026

(54) INTELLIGENT VEHICLE CONTROLLER

(71) Applicant: LINAMAR CORPORATION, Guelph (CA)

(72) Inventors: Bogdan Havrisciuc, Romulus, MI (US); Edward N. Carlson, Ann Arbor, MI (US)

(73) Assignee: LINAMAR CORPORATION, Guelph (CA)

( * ) Notice: Subject to any disclaimer, the term of this patent is extended or adjusted under 35 U.S.C. 154(b) by 129 days.

(21) Appl. No.: 18/422,763

(22) Filed: Jan. 25, 2024

(65) Prior Publication Data

US 2024/0351478 A1 Oct. 24, 2024

Related U.S. Application Data

(60) Provisional application No. 63/443,997, filed on Feb. 8, 2023.

(51) Int. Cl.
B60L 58/30 (2019.01)
B60L 58/12 (2019.01)

(52) U.S. Cl.
CPC .............. B60L 58/30 (2019.02); B60L 58/12 (2019.02); *B60L 2240/12* (2013.01); *B60L 2240/60* (2013.01); *B60L 2250/16* (2013.01)

(58) Field of Classification Search
CPC ...... B60L 58/30; B60L 58/12; B60L 2240/12; B60L 2240/60; B60L 2250/16; B60L 2250/10; B60L 2260/52; B60L 2260/54; B60L 58/40
See application file for complete search history.

(56) References Cited

U.S. PATENT DOCUMENTS

| | | | |
|---|---|---|---|
| 2010/0138142 A1 | 6/2010 | Pease | |
| 2012/0239283 A1* | 9/2012 | Fasse | B60L 50/40 |
| | | | 701/123 |
| 2013/0073113 A1 | 3/2013 | Wang et al. | |
| 2022/0299337 A1* | 9/2022 | Joao | H02J 7/00032 |

FOREIGN PATENT DOCUMENTS

WO WO-2013076785 A1 * 5/2013 ............. B60L 58/30

* cited by examiner

*Primary Examiner* — Alan D Hutchinson
(74) *Attorney, Agent, or Firm* — Miller, Canfield, Paddock and Stone

(57) ABSTRACT

A method is provided for monitoring the operation of a vehicle powered by a fuel cell and a battery. The method comprises the steps of determining an energy capacity of the vehicle, estimating an energy required for the vehicle to travel on a route to a destination, determining whether the energy required is greater than the energy capacity, and if it is determined that the energy required is greater than the energy capacity, sending a notification to alert a driver of the vehicle.

16 Claims, 10 Drawing Sheets

INTELLIGENT VEHICLE CONTROLLER

CROSS-REFERENCE TO RELATED APPLICATIONS

This application claims priority to U.S. Provisional Application 63/443,997, filed on Feb. 8, 2023, the disclosure of which is hereby incorporated by reference in its entirety.

TECHNICAL FIELD

The present invention relates to systems and methods for monitoring the energy requirements of a fuel cell electric vehicle. More particularly, the invention relates to systems and methods for monitoring whether the energy required by the fuel cell electric vehicle exceeds the energy capacity of the vehicle as necessary to complete its mission prior to refueling.

BACKGROUND OF THE INVENTION

Fuel cell electric vehicles (FCEVs) are primarily powered by hydrogen fuel cells, which convert pressurized hydrogen gas into electrical energy used to power an electric motor(s) which provides mechanical power to rotate the vehicle wheels. The FCEV also contains a high voltage battery system (hereinafter "battery"), which acts as an electrical energy buffer for these FCEVs. When the fuel cells produce more electricity than required by the FCEV, the excess energy may be used to charge the battery. When the power required by the FCEV exceeds the electricity generated by the fuel cells, the energy stored in the battery is discharged to provide the additional energy required by the FCEV. The battery may also provide storage for electrical energy that results from braking and deceleration of the FCEV while the drive motors are functioning as generators to absorb the kinetic energy of the FCEV.

Currently, FCEVs provide drivers with gauges that indicate how much hydrogen fuel remains in the vehicle hydrogen storage tank(s). However, these vehicles may not indicate the amount of charge left in the battery, and the drivers are not necessarily aware of the extent to which the vehicle requires a combination of fuel cell power and battery power to operate. Thus, drivers may find themselves in a condition where the battery state of charge is low and requires recharging before the vehicle can continue to operate even though the hydrogen storage tanks still contain adequate amounts of hydrogen for operation. Also, drivers may be unaware that environmental conditions and their driving habits may affect the degree to which the vehicle draws power from the battery and the rate at which power is discharged from the battery. Accordingly, drivers may, without realizing it, run down their battery to a point that interferes with their travel mission.

SUMMARY OF THE INVENTION

The present invention assists drivers of FCEVs to determine the energy required to safely transport the driver along a route to the driver's destination and to assess, under real-time conditions, whether the FCEV will have enough energy to complete the route to the destination. If the energy capacity provided by the fuel cell and the battery under current conditions is not sufficient, the driver will be notified of various options to allow the driver to complete the route.

According to one aspect of the invention, a method is provided for monitoring the operation of a vehicle powered by a fuel cell and a battery. The method comprises the steps of determining an energy capacity of the vehicle, estimating an energy required for the vehicle to travel on a route to a destination, determining whether the energy required is greater than the energy capacity, and if it is determined that the energy required is greater than the energy capacity, sending a notification to alert a driver of the vehicle.

According to another aspect of the invention, a fuel cell electric vehicle is provided comprising a fuel cell, a battery, and a control system. The control system is configured to determine an energy capacity of the vehicle, estimate an energy required for the vehicle to travel on a route to a destination, determine whether the energy required is greater than the energy capacity, and if the control system determines that the energy required is greater than the energy capacity, the control system is configured to send a notification to alert a driver of the vehicle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Figure 1:
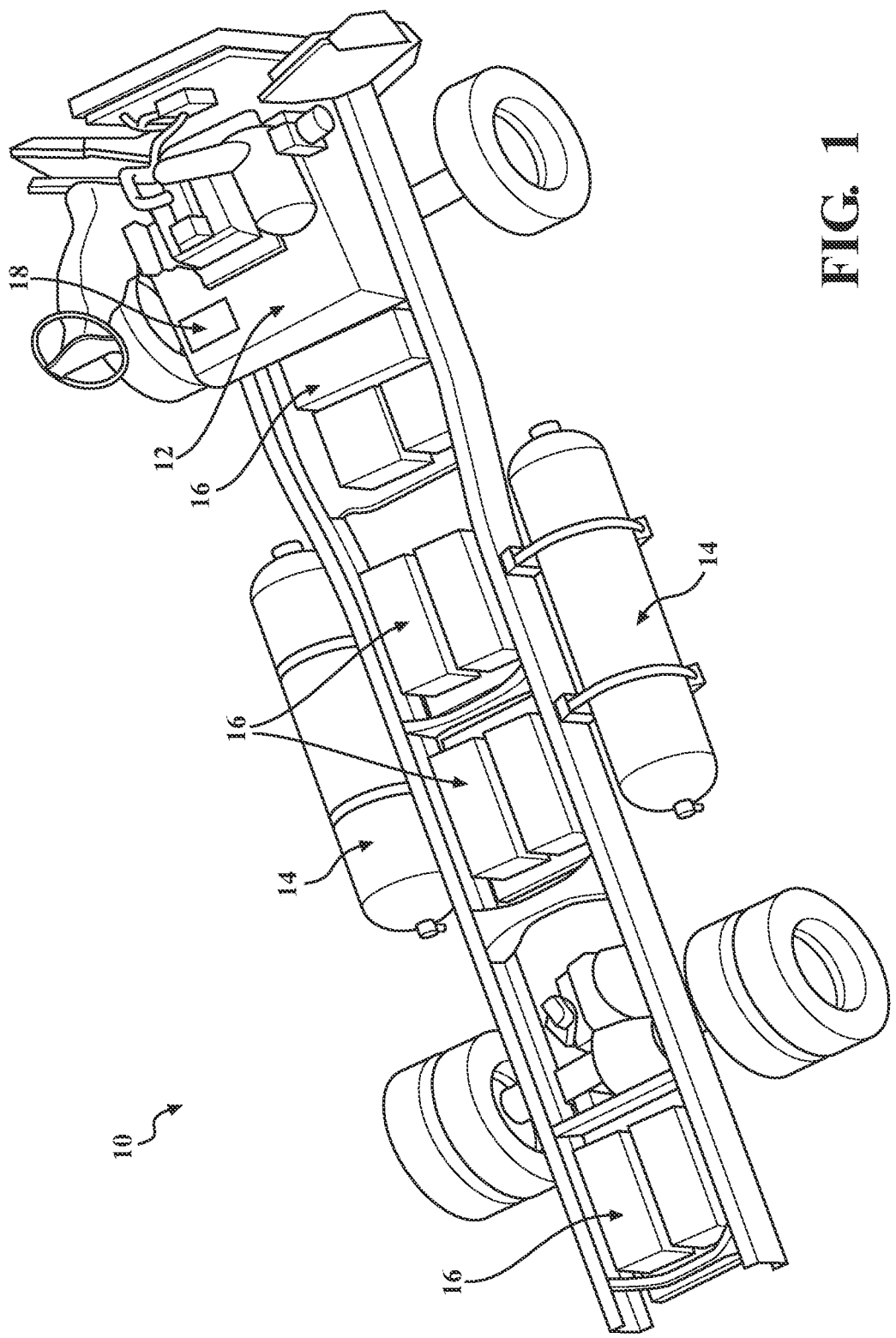
FIG. 1 is a fragmentary perspective view of a fuel cell electric vehicle (FCEV) according to embodiments of the present invention.

FIG. 1 illustrates one embodiment of a fuel cell electric vehicle (FCEV) 10 in accordance with the present invention. The FCEV 10 includes a fuel cell 12, hydrogen tanks 14 and battery modules 16. The hydrogen tanks 14 include hydrogen under pressure. The pressurized hydrogen is fed from the hydrogen tanks 14 to the fuel cell 12. The fuel cell 12 converts the hydrogen into electricity, which is used to power the FCEV 10.

The battery modules 16 are used to supplement the power from the fuel cell 12. When the power required by the FCEV 10 exceeds the electricity generated by the fuel cell 12, the energy stored in the battery modules 16 provides the additional energy required by the FCEV 10. When the fuel cells 12 produce more electricity than required by the FCEV 10, the excess energy may be used to charge the battery modules 16. Thus, the battery modules 16 act as buffers to charge and discharge depending on the demands of the drive cycle or the output of the fuel cell 12. The battery modules 16 also are charged by deceleration and brake energy from the FCEV 10. The FCEV 10 also includes a control system 18 to balance the dynamics between the fuel cell 12 and the battery modules 16 to optimize the use of energy.

Figure 2:
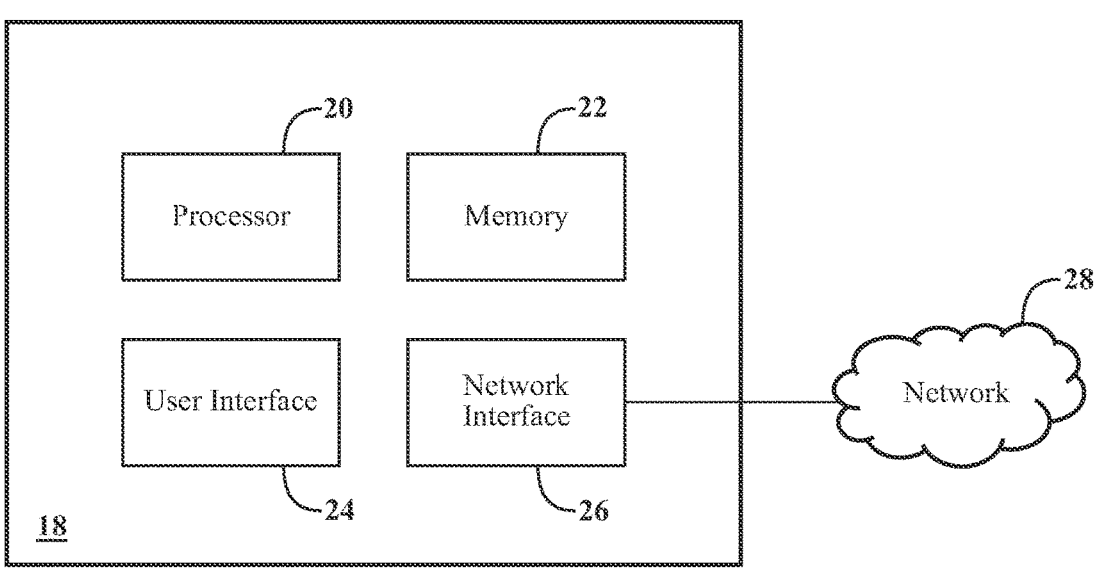
FIG. 2 shows an exemplary system for monitoring the energy requirements of the FCEV of FIG. 1.

Referring to FIG. 2, the control system 18 includes a processor 20, a memory 22, a user interface 24 and a network interface 26. The components are standard in most computer systems and are suitable to practice methods and systems consistent with the present invention. The processor 20 processes information and executes the computer executable instructions. The memory 22 stores information and instructions to be executed by the processor 20. The memory 22 includes computer storage media in the form of volatile and/or nonvolatile memory, such as read only memory (ROM) and random access memory (RAM). The user interface 24 connects the control system 18 to various input devices, such as a keyboard, mouse, touch pad, or microphone, and to various output devices, such as a display device or a speaker. The network interface 26 connects the control system 18 to a network 28, such as a Controller Area Network (CAN bus), a Local Area Network, a Wide Area Network, or the Internet.

Figure 3:
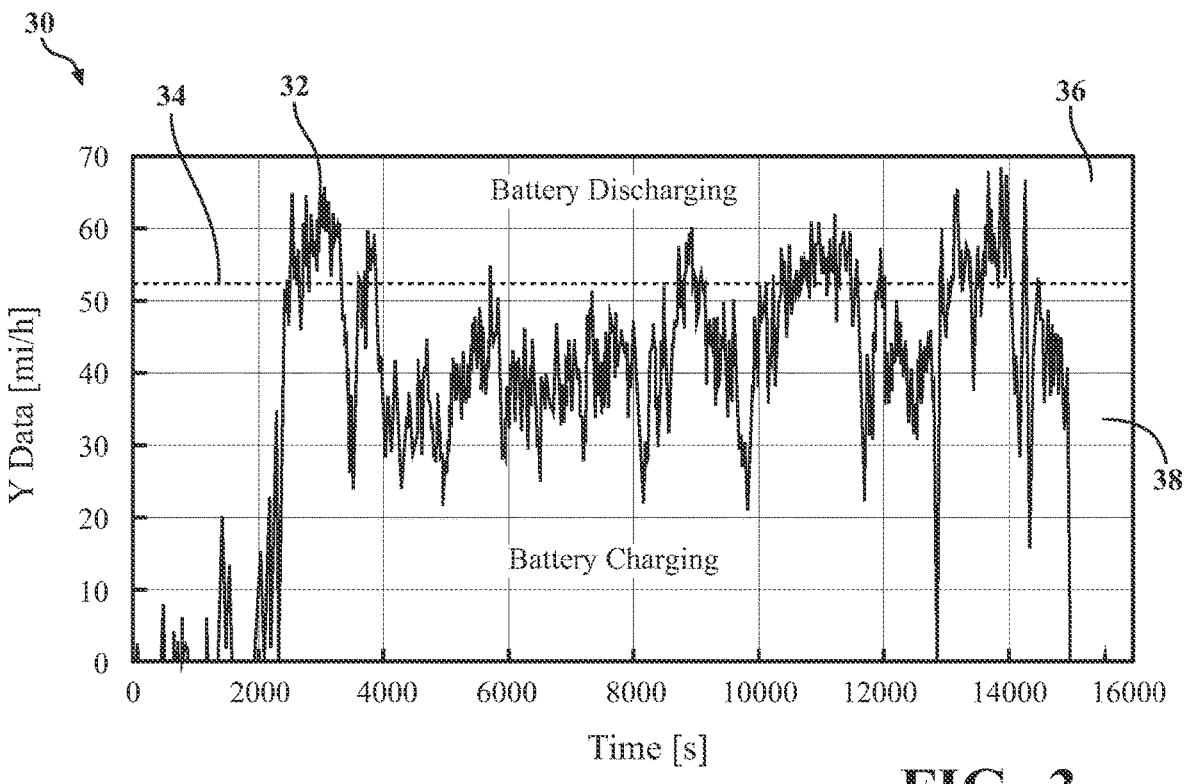
FIG. 3 shows an exemplary drive cycle for the FCEV of FIG. 1.

One factor that affects the amount of energy required to operate an FCEV 10 is the speed at which the FCEV 10 is being driven. FIG. 3 shows the drive cycle 30 for an exemplary FCEV 10. As illustrated, when the speed 32 of the FCEV 10 exceeds a threshold 34 (i.e., approximately 52 miles per hour in this example), the power required by the FCEV 10 exceeds the electricity generated by the fuel cell 12 and thus, the battery is discharging 36. When the speed 32 of the FCEV 10 is less than the threshold 34, the power required by the FCEV 10 is less than the electricity generated by the fuel cell 12 and thus, the battery may be charging 38.

Figure 4:
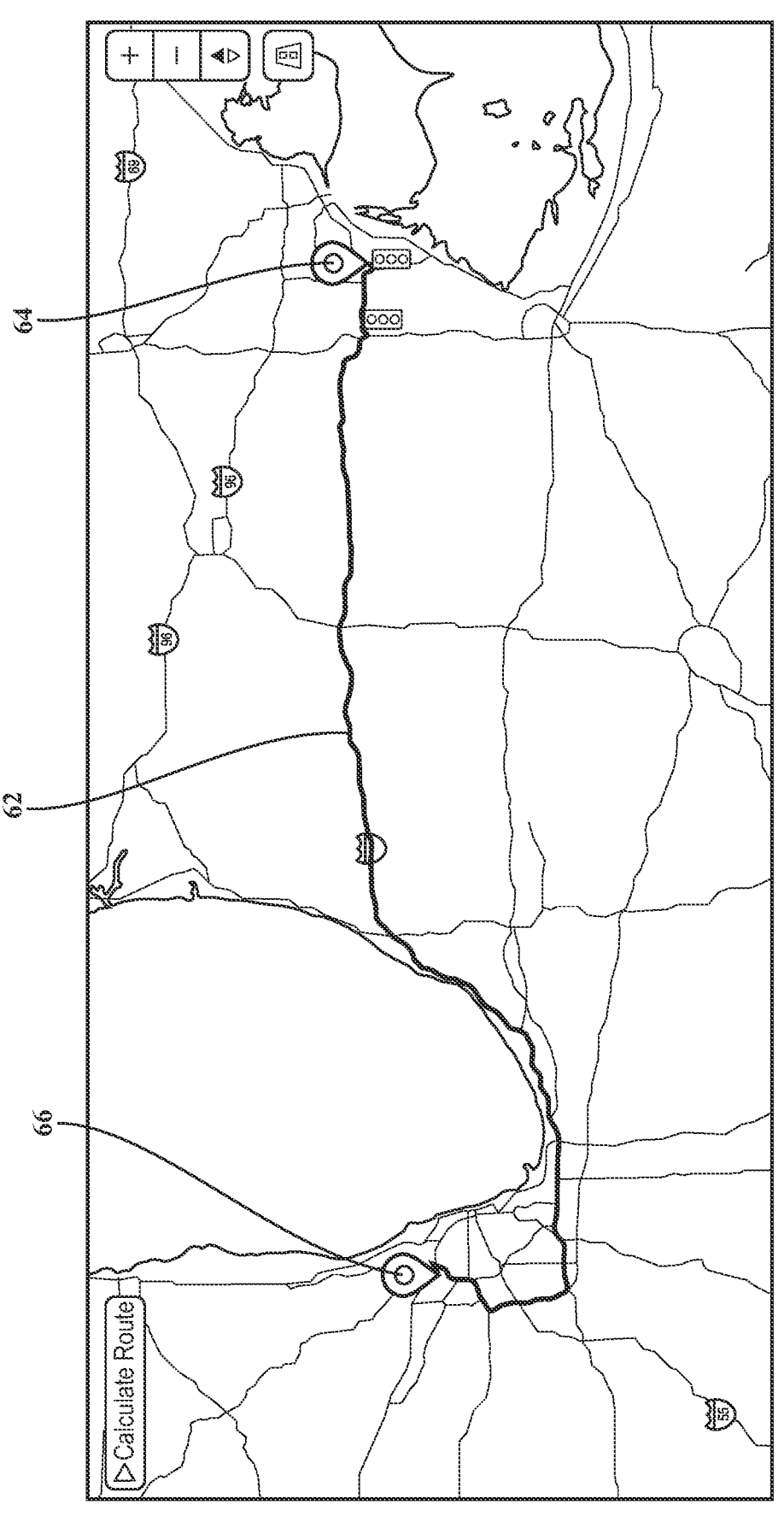
FIG. 4 shows the route selected for a simulation to assess the performance of the FCEV of FIG. 1 at various speeds.

Vehicle speed has a significant effect on the power requirements of a vehicle. For example, the aerodynamic drag on vehicles tends to increase exponentially as the vehicle speed increases. To illustrate drag losses on a vehicle, simulations were conducted at different steady-state speeds. The simulation compared the drive cycles of an FCEV 10 along the route 62 reflected in FIG. 4 from Detroit Metro Airport 64 to Chicago O'Hare International Airport 66 with five different top speeds: 45 mph, 50 mph, 55 mph, 60 mph and 75 mph.

Figure 5:
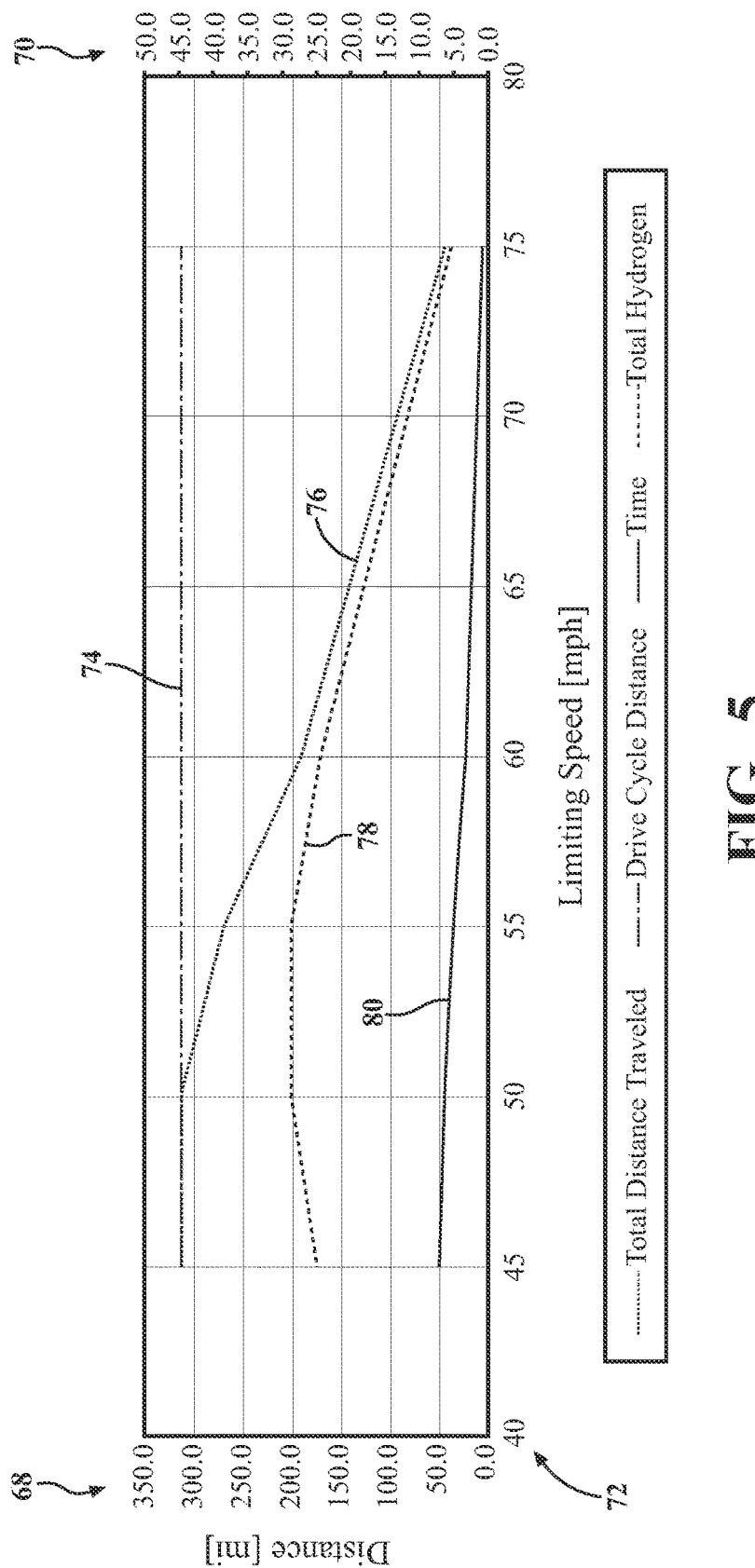
FIG. 5 shows a summary of the simulations at various speeds.

Table 1 and FIG. 5 provide a summary of the results of the drive simulation. FIG. 5 plots the distance traveled 68 and the simulation time and hydrogen consumption 70 for each of the speed limits 72. FIG. 5 identifies the distance to the final destination 74, the distance traveled by each of the simulations 76, the total hydrogen consumed for each of the simulations 78 and the duration for each simulation 80.

TABLE 1

| Limit | 45 mph | 50 mph | 55 mph | 60 mph | 75 mph |
|---|---|---|---|---|---|
| Distance | 312.7 miles | 312.3 miles | 268.6 miles | 191.6 miles | 44.1 miles |
| Time | 7.1 hours | 6.4 hours | 5.1 hours | 3.3 hours | 0.8 hours |
| Total Hydrogen | 25.0 kg | 28.8 kg | 28.8 kg | 24.4 kg | 5.4 kg |
| Total Energy Consumed | 359 kW-h | 418.5 kW-h | 411.8 kW-h | 340.3 kW-h | 92.4 kW-h |
| Route Completed? | Yes | Yes | No | No | No |
| Hydrogen Depleted? | No | Yes | Yes | No | No |
| Battery Depleted? | No | No | No | Yes | Yes |

Figure 6:
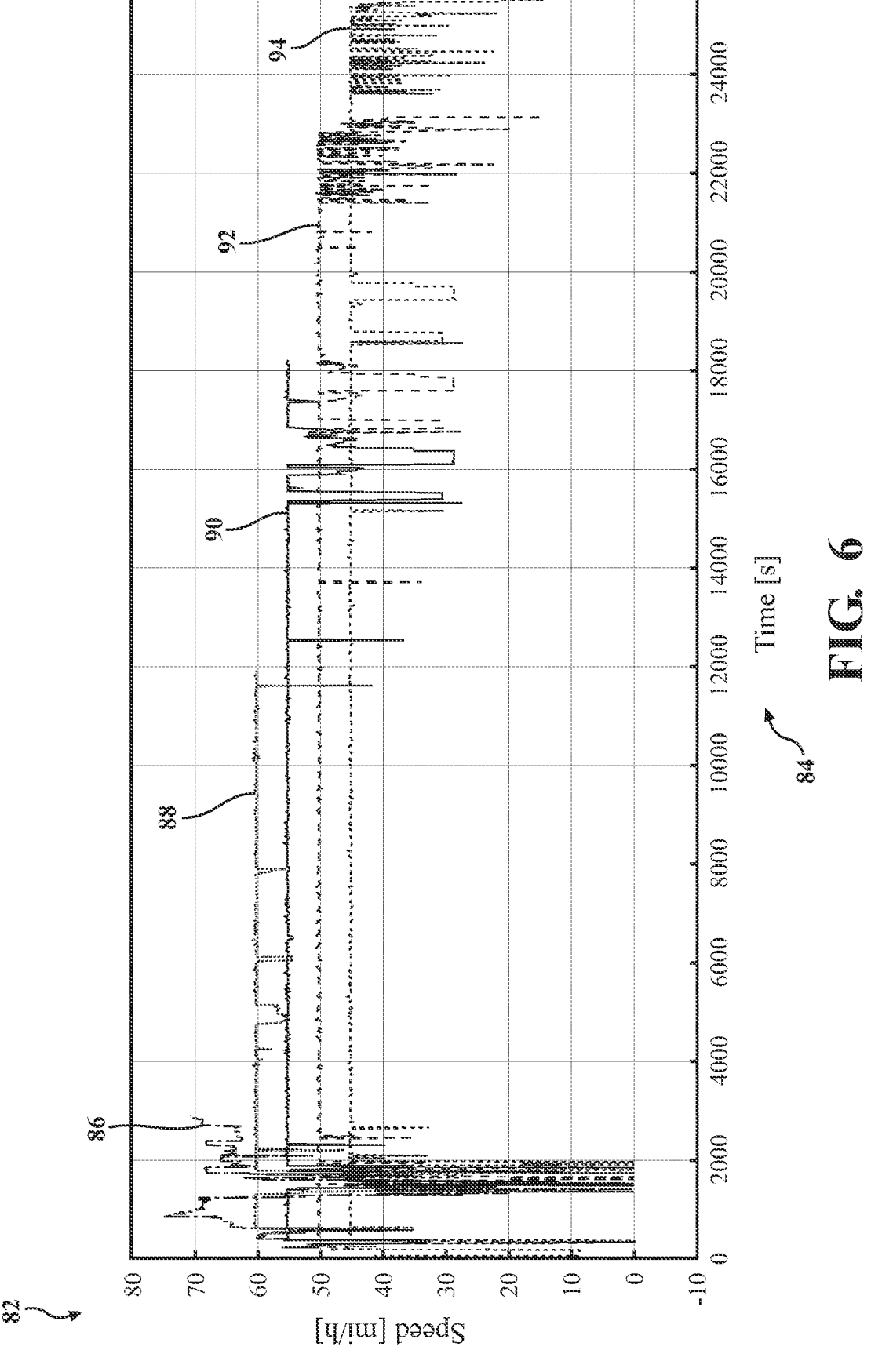
FIG. 6 shows the drive cycles for each of the simulations.
Figure 7:
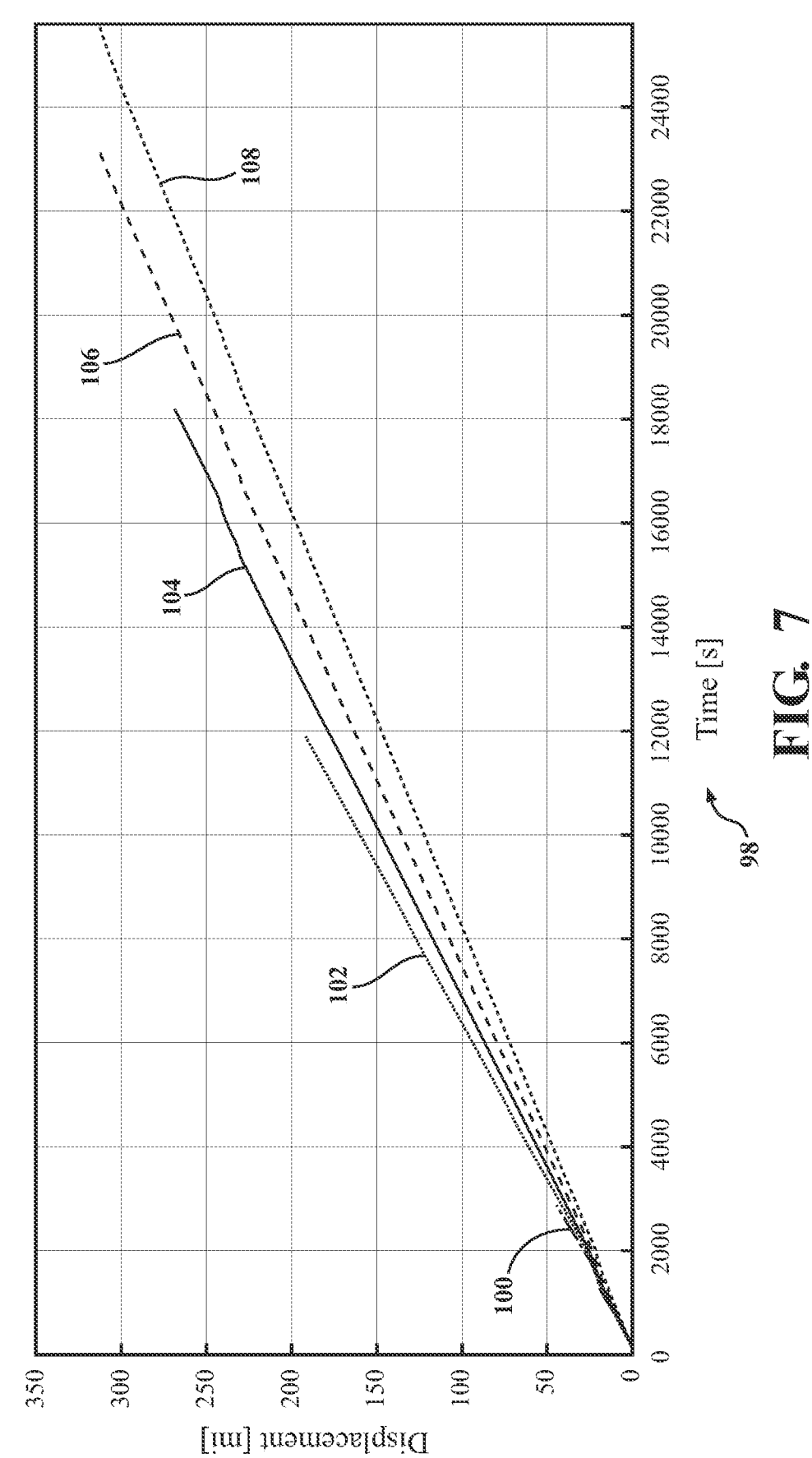
FIG. 7 shows the distance traveled for each of the simulations.
Figure 8:
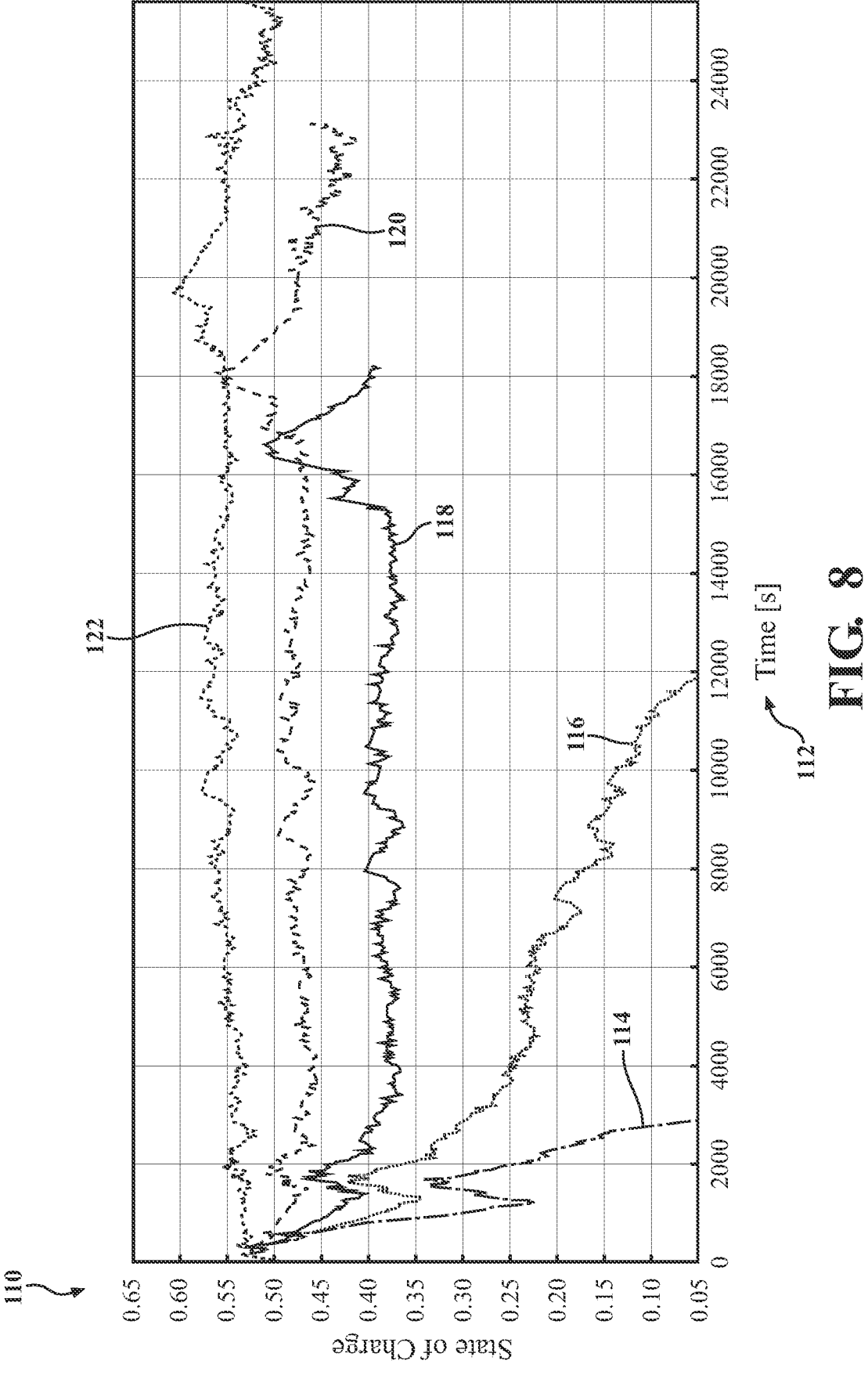
FIG. 8 shows the battery state of charge (SOC) for each of the simulations.
Figure 9:
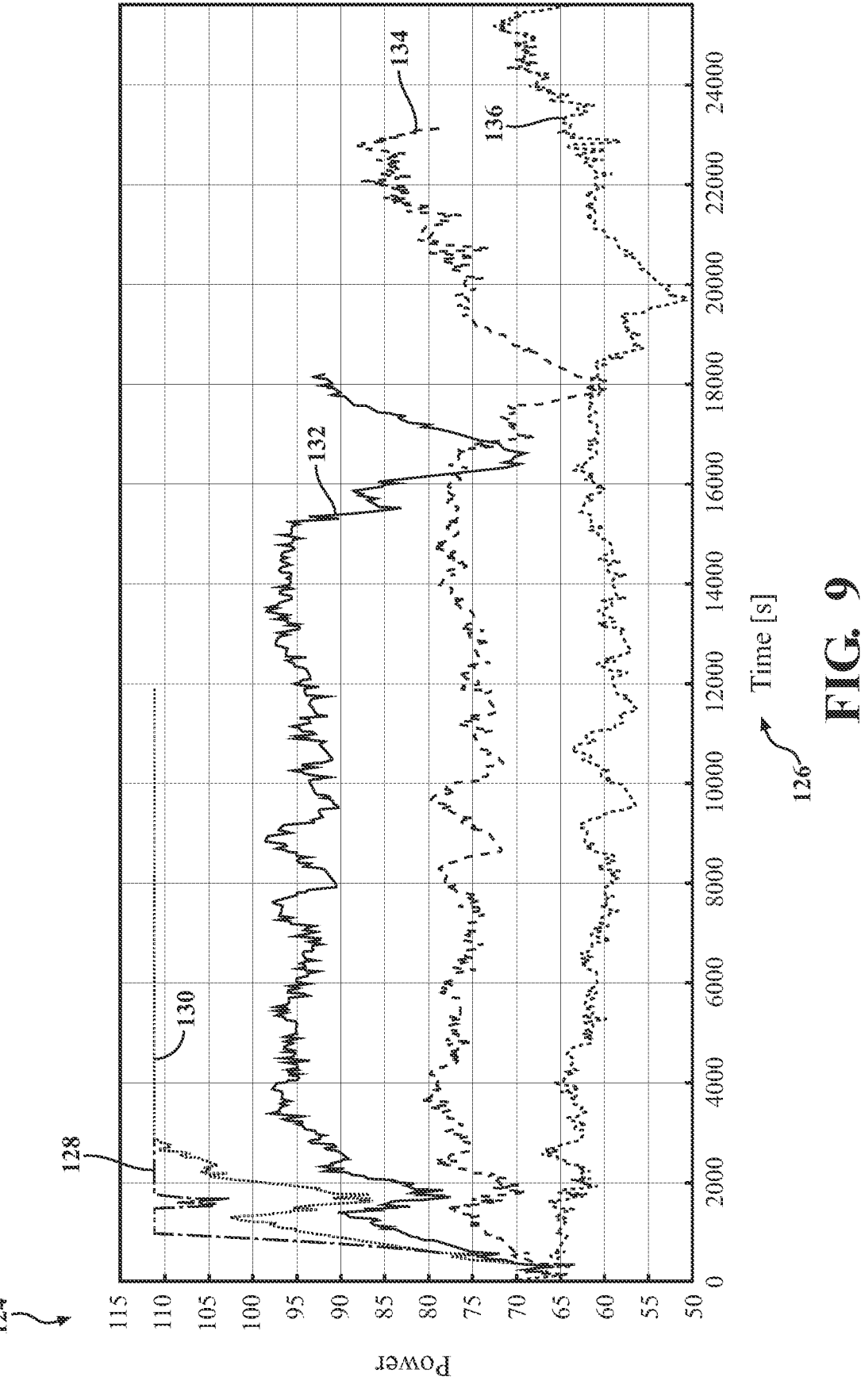
FIG. 9 shows the power output of the fuel cell for each of the simulations.
Figure 10:
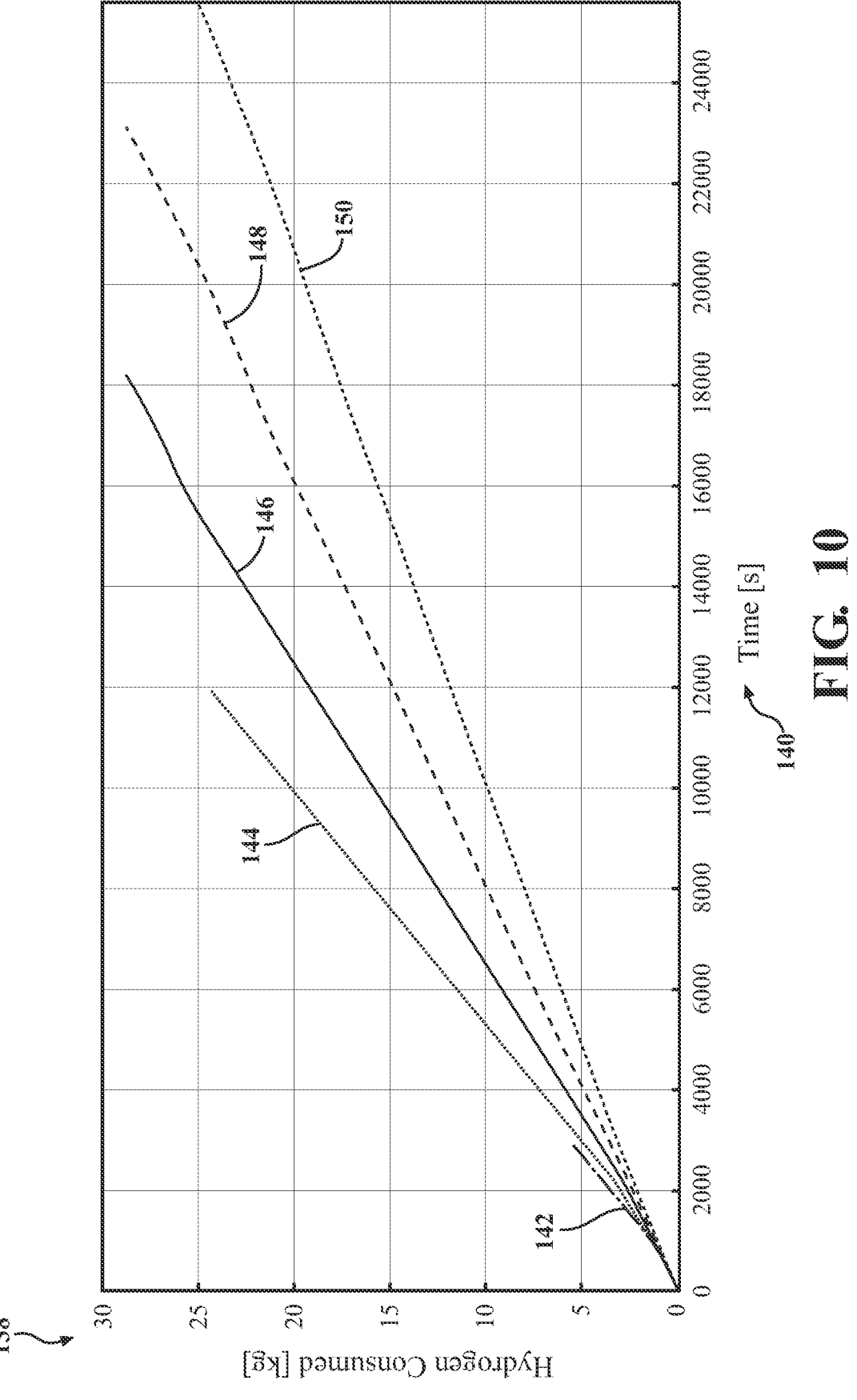
FIG. 10 shows the hydrogen consumed for each of the simulations.

FIGS. 6-10 provide details for each of the simulations. FIG. 6 shows the drive cycle (i.e., speed 82 over time 84) for the 75 mph simulation 86, the 60 mph simulation 88, the 55 mph simulation 90, the 50 mph simulation 92 and the 45 mph simulation 94. FIG. 7 shows the distance traveled 96 over time 98 for the 75 mph simulation 100, the 60 mph simulation 102, the 55 mph simulation 104, the 50 mph simulation 106 and the 45 mph simulation 108. FIG. 8 shows the battery state of charge (SOC) 110 over time 112 for the 75 mph simulation 114, the 60 mph simulation 116, the 55 mph simulation 118, the 50 mph simulation 120 and the 45 mph simulation 122. FIG. 9 shows the power output 124 of the fuel cell 12 over time 126 for the 75 mph simulation 128, the 60 mph simulation 130, the 55 mph simulation 132, the 50 mph simulation 134 and the 45 mph simulation 136. FIG. 10 shows the hydrogen consumed 138 over time 140 for the 75 mph simulation 142, the 60 mph simulation 144, the 55 mph simulation 146, the 50 mph simulation 148 and the 45 mph simulation 150.

As reflected in FIG. 9, the power outputs of the fuel cells 12 for the simulations with maximum speeds of 75 mph (128) and 60 mph (130) reached full capacity. Thus, additional energy to drive the FCEVs 10 was provided by the battery modules 16, which, as reflected in FIG. 8, were depleted for both the 75 mph simulation (114) and the 60 mph simulation (116) before the simulations reached the final destination. The simulation at the lower speed of 60 mph depleted the battery module 16 (116) slower than the simulation at the higher speed of 75 mph (114), and was able to travel 191.6 miles in 3.3 hours (102, FIG. 7) before depleting its battery module 16, whereas the simulation at 75 mph only traveled 44.1 miles in 0.8 hours (100, FIG. 7) before depleting its battery module 16. Neither the 75 mph simulation (142, FIG. 10) nor the 60 mph simulation (144, FIG. 10) depleted the hydrogen in their tanks 14.

The simulation with a maximum speed of 55 mph did not reach maximum power output on the fuel cell 12 (132, FIG. 9). Thus, the state of charge on the battery module 16 (118, FIG. 8) remained relatively consistent throughout a significant part of the drive. However, the hydrogen in the tank 14 (146, FIG. 10) depleted before the simulation reached the final destination. The 55 mph simulation traveled 268.6 miles in 5.1 hours (104, FIG. 7) before depleting the hydrogen.

The simulations with maximum speeds of 50 mph (106, FIG. 7) and 45 mph (108, FIG. 7) both reached the final destination. The higher speed of 50 mph depleted the hydrogen in its tank 14 (148, FIG. 10) by the time it reached the final destination, but the travel time for the 50 mph simulation was 6.4 hours rather than the 7.1 hour travel time for the 45 mph simulation. By limiting the speed of the FCEV 10, the 50 mph (134 FIG. 9) and 45 mph (136 FIG. 9) simulations were able to finish the route with less energy consumed.

The simulations reflect how driving conditions (namely speed) affect where the FCEV 10 derives its energy source. Because the amount of energy required to power an FCEV 10 depends greatly on the drive conditions and the route, the control system 18 in the present invention considers these factors and notifies the driver (either directly or through a dispatcher) when changes need to be made either in the drive cycle or to the fuel supply to ensure that the driver makes it to his/her final destination.

Figure 11:
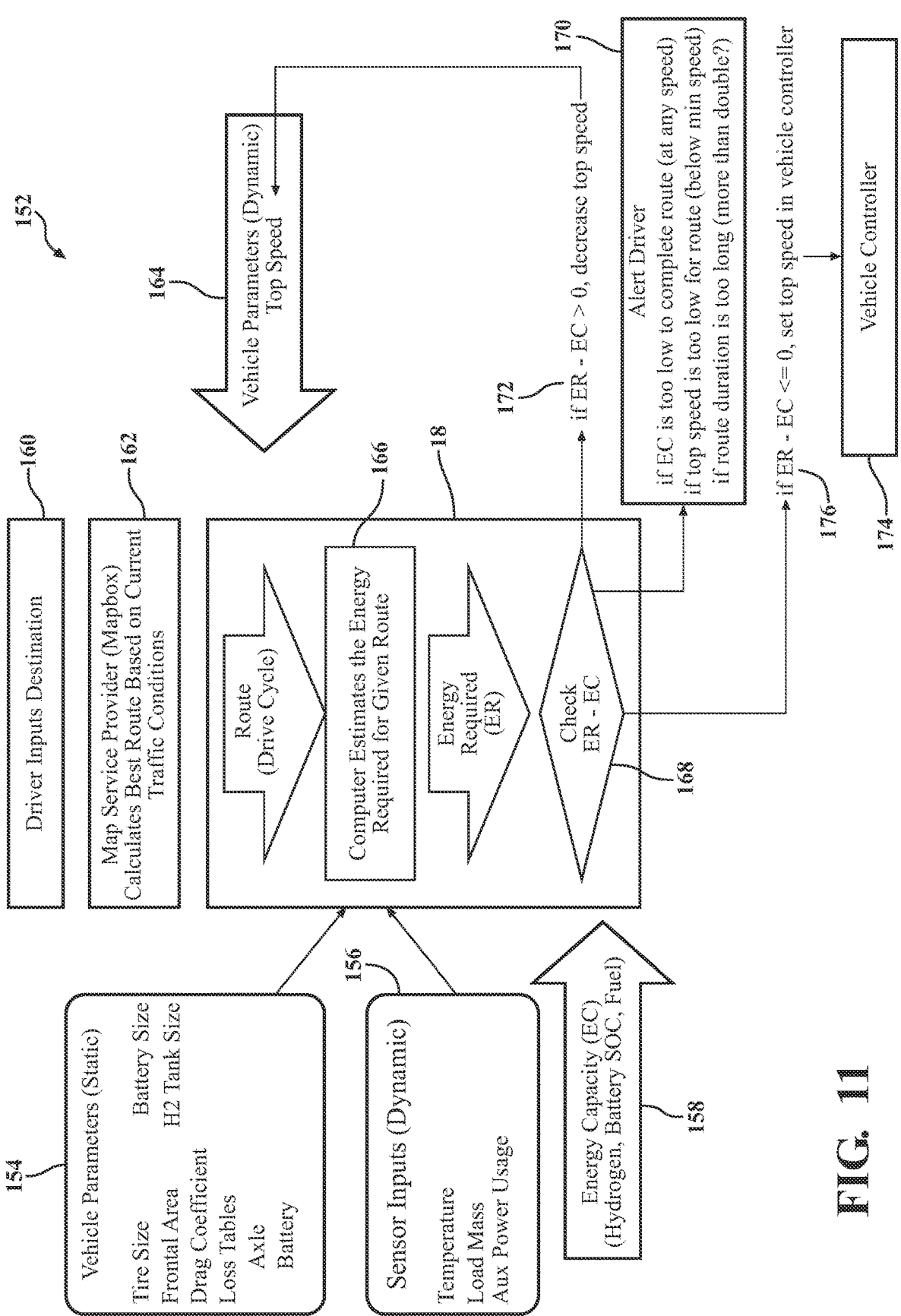
FIG. 11 is a flow diagram illustrating an exemplary method for monitoring the energy requirements of the FCEV of FIG. 1.

FIG. 11 shows an exemplary method 152 performed by the control system 18 in accordance with the present invention. The control system 18 gathers information regarding the FCEV 10 to determine the energy capacity of the FCEV

10, and to determine the amount of energy required to power the FCEV 10. For example, the control system 18 obtains information regarding static vehicle parameters (step 154) from memory 22. The static vehicle parameters include tire size, frontal area, drag coefficient, loss tables for the axle and the battery, battery size and hydrogen tank size. The control system 18 also obtains dynamic information from various sensor inputs (step 156), such as the temperature, wind speed, load mass, and auxiliary power usage. The control system 18 calculates the energy capacity (EC) (step 158) of the FCEV 10 based on the amount of hydrogen in the tanks 14 and the state of charge (SOC) of the battery modules 16. The driver inputs his/her destination (step 160) on the user interface 24, and a map service provider, such as Mapbox, calculates the best route based on the current traffic conditions (step 162). The control system 18 also monitors dynamic vehicle parameters (step 164), such as the speed of the FCEV 10. The control system 18 processes this information to estimate the energy required (ER) to complete the route (step 166). The control system 18 determines whether the energy required (ER) exceeds the energy capacity (EC) (step 168). The control system 18 alerts the driver if the energy capacity is too low to complete the route (step 170). The control system 18 also monitors other driving conditions and notifies the driver of any anomalies. For example, the control system 18 will notify the driver if it determines that the top speed of the FCEV 10 is too low for the route. It also may notify the driver if the route duration is too long. If the control system 18 determines that the energy required exceeds the energy capacity, it may decrease the top speed (step 172) of the vehicle controller 174 to conserve the energy required to complete the route, suggest an alternate or limited route, schedule a rest stop to allow the fuel cell to charge the battery, or schedule a hydrogen refueling stop. Conversely, if the energy required is less than the energy capacity, the control system 18 may set the top speed (step 176) of the vehicle controller 174 accordingly, or allow additional routes to be scheduled.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A method for monitoring the operation of a vehicle powered by a fuel cell and a battery, the method comprising the steps of:

providing a destination;

determining a route to the destination;

determining a top speed of the vehicle;

determining an energy capacity of the vehicle;

estimating an energy required for the vehicle to travel on the route to the destination;

determining whether the energy required is greater than the energy capacity;

if it is determined that the energy required is greater than the energy capacity, sending a notification to alert a driver of the vehicle;

if it is determined that the energy required is not greater than the energy capacity, setting a maximum speed for the vehicle equal to the top speed for the vehicle; and if it is determined that the energy required is greater than the energy capacity, decreasing the maximum speed for the vehicle such that the maximum speed is less than the top speed.

2. The method of claim 1, wherein the step of determining the energy capacity comprises the steps of:

determining a state of charge on the battery;

determining an amount of fuel in the vehicle to supply the fuel cell; and calculating the energy capacity based on the state of charge on the battery and the amount of fuel in the vehicle.

3. The method of claim 1, wherein the step of estimating the energy required comprises the steps of:

determining a dynamic parameter of the vehicle; and using the dynamic parameter to calculate the energy required.

4. The method of claim 3, wherein the dynamic vehicle parameter includes a speed of the vehicle.

5. The method of claim 4, wherein the step of estimating the energy required comprises the steps of:

retrieving a static parameter of the vehicle; and using the static parameter to calculate the energy required.

6. The method of claim 5, wherein the static vehicle parameter includes a tire size, a frontal area, a drag coefficient, a battery size or a hydrogen tank size.

7. The method of claim 6, wherein the step of estimating the energy required comprises the steps of:

determining a dynamic sensory input to the vehicle; and using the dynamic sensory input to calculate the energy required.

8. The method of claim 7, wherein the dynamic sensory input includes a temperature, a load mass or an auxiliary power usage.

9. A fuel cell electric vehicle, comprising:

a fuel cell;

a battery; and a control system, wherein the control system is configured to:

determine an energy capacity of the vehicle;

receive a destination;

determine a route to the destination;

determine a top speed of the vehicle;

estimate an energy required for the vehicle to travel on the route to the destination;

determine whether the energy required is greater than the energy capacity;

if the control system determines that the energy required is not greater than the energy capacity, the control system is configured to set a maximum speed for the vehicle equal to the top speed for the vehicle; and if the control system determines that the energy required is greater than the energy capacity, the control system is configured to send a notification to alert a driver of the vehicle and the control system is configured to decrease the maximum speed for the vehicle such that the maximum speed is less than the top speed.

10. The fuel cell electric vehicle of claim 9, wherein when the control system determines the energy capacity of the vehicle, the control system is configured to:

determine a state of charge on the battery;

determine an amount of fuel in the vehicle to supply the fuel cell; and calculate the energy capacity based on the state of charge on the battery and the amount of fuel in the vehicle.

11. The fuel cell electric vehicle of claim 9, wherein when the control system estimates the energy required, the control system is configured to:

determine a dynamic parameter of the vehicle; and use the dynamic parameter to calculate the energy required.

12. The fuel cell electric vehicle of claim 11, wherein the dynamic vehicle parameter includes a speed of the vehicle.

13. The fuel cell electric vehicle of claim 12, wherein when the control system estimates the energy required, the control system is configured to:

retrieve a static parameter of the vehicle; and use the static parameter to calculate the energy required.

14. The fuel cell electric vehicle of claim 13, wherein the static vehicle parameter includes a tire size, a frontal area, a drag coefficient, a battery size or a hydrogen tank size.

15. The fuel cell electric vehicle of claim 14, wherein when the control system estimates the energy required, the control system is configured to:

determine a dynamic sensory input to the vehicle; and use the dynamic sensory input to calculate the energy required.

16. The fuel cell electric vehicle of claim 15, wherein the dynamic sensory input includes a temperature, a load mass or an auxiliary power usage.

* * * * *